United States Patent
Choi et al.

(10) Patent No.: US 10,959,236 B2
(45) Date of Patent: Mar. 23, 2021

(54) METHOD AND APPARATUS FOR INTERFERENCE DEMODULATION REFERENCE SIGNAL DETECTION WITH SERVING SIGNAL CANCELLATION

(71) Applicant: Samsung Electronics Co., Ltd., Suwon-si (KR)

(72) Inventors: Yoo Jin Choi, San Diego, CA (US); Dongwoon Bai, San Diego, CA (US); Jungwon Lee, San Diego, CA (US); Sungyoon Cho, Seoul (KR); Heunchul Lee, Hwaseong-si (KR); Sungsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 16/030,779

(22) Filed: Jul. 9, 2018

(65) Prior Publication Data
US 2018/0323929 A1 Nov. 8, 2018

Related U.S. Application Data

(63) Continuation of application No. 15/462,665, filed on Mar. 17, 2017, now Pat. No. 10,038,532.
(Continued)

(51) Int. Cl.
*H04W 4/00* (2018.01)
*H04W 72/06* (2009.01)
(Continued)

(52) U.S. Cl.
CPC ........... *H04W 72/06* (2013.01); *H04J 11/004* (2013.01); *H04J 11/0046* (2013.01);
(Continued)

(58) Field of Classification Search
CPC ............ H04L 25/0204; H04L 25/0226; H04L 5/0035; H04L 5/0048; H04W 72/0446
See application file for complete search history.

(56) References Cited

U.S. PATENT DOCUMENTS 8,724,723 B2  5/2014  Panicker et al.
9,136,953 B2  9/2015  Yoo et al.
(Continued)

FOREIGN PATENT DOCUMENTS

WO  WO 2016/021868 A1  2/2016
WO  WO 2016/021944 A1  2/2016

OTHER PUBLICATIONS

Fernanez-Lopez, Victor, et al., "Interference Management with Successive Cancellation for Dense Small Cell Networks," Vehicular Technology Conference (VTC Spring), 2016 IEEE 83rd, IEEE, 2016, (5 pages).
(Continued)

*Primary Examiner* — Minh Trang T Nguyen
(74) *Attorney, Agent, or Firm* — Lewis Roca Rothgerber Christie LLP

(57) ABSTRACT

A system and method for characterizing an interference demodulation reference signal (DMRS) in a piece of user equipment (UE), e.g., a mobile device. The UE determines whether the serving signal is transmitted in a DMRS-based transmission mode; if it is, the UE cancels the serving DMRS from the received signal; otherwise the UE cancels the serving data signal from the received signal. The remaining signal is then analyzed for the amount of power it has in each of four interference DMRS candidates, and hypothesis testing is performed to determine whether interference DMRS is present in the signal, and, if so, to determine the rank of the interference DMRS, and the port and scrambling identity of each of the interference DMRS layers.

20 Claims, 5 Drawing Sheets

Related U.S. Application Data

(60) Provisional application No. 62/448,288, filed on Jan. 19, 2017.

(51) Int. Cl.
*H04L 27/26* (2006.01)
*H04J 11/00* (2006.01)
*H04L 5/00* (2006.01)

(52) U.S. Cl.
CPC ........ *H04L 27/2691* (2013.01); *H04L 5/0023* (2013.01); *H04L 5/0051* (2013.01)

(56) References Cited

U.S. PATENT DOCUMENTS

| | | | |
|---|---|---|---|
| 9,338,673 B2 | 5/2016 | Cheng et al. | |
| 2005/0095985 A1* | 5/2005 | Hafeoz | H04L 25/03331 455/67.11 |
| 2013/0039285 A1 | 2/2013 | Sorrentino | |
| 2014/0233407 A1 | 8/2014 | Pourahmadi et al. | |
| 2014/0243030 A1 | 8/2014 | Kim et al. | |
| 2014/0247799 A1 | 9/2014 | Suzuki et al. | |
| 2015/0282192 A1 | 10/2015 | Shin et al. | |
| 2015/0312917 A1 | 10/2015 | Farkas et al. | |
| 2015/0358103 A1 | 12/2015 | Ohwatari et al. | |
| 2015/0358104 A1 | 12/2015 | Ohwatari et al. | |
| 2016/0021565 A1 | 1/2016 | Kim et al. | |
| 2016/0036542 A1 | 2/2016 | Gong et al. | |
| 2016/0073415 A1 | 3/2016 | Rahman et al. | |
| 2016/0135194 A1 | 5/2016 | Kim et al. | |
| 2016/0174174 A1* | 6/2016 | Chae | H04W 56/001 370/350 |
| 2016/0212752 A1 | 7/2016 | Xu et al. | |
| 2016/0226538 A1 | 8/2016 | Kim et al. | |
| 2016/0227525 A1 | 8/2016 | Werner et al. | |
| 2016/0294526 A1 | 10/2016 | Kim et al. | |
| 2016/0353317 A1 | 12/2016 | Kim et al. | |
| 2017/0214429 A1* | 7/2017 | Eistein | H04B 1/1027 |

OTHER PUBLICATIONS

Moon, Sangmi, et al., "Advanced Receiver Based on Soft Decision for Interference Suppression and Cancellation in a Sidehaul System," Wireless Personal Communications, 2016, 87:4, pp. 1241-1263.

Zhang, Jian et al., "A Method of Constellation Blind Detection for Spectrum Efficiency Enhancement," 2016 18th International Conference on Advanced Communication Technology (ICACT), IEEE, 2016, pp. 148-152.

* cited by examiner

METHOD AND APPARATUS FOR INTERFERENCE DEMODULATION REFERENCE SIGNAL DETECTION WITH SERVING SIGNAL CANCELLATION

CROSS-REFERENCE TO RELATED APPLICATION(S)

This application is a continuation of U.S. patent application Ser. No. 15/462,665, filed Mar. 17, 2017, which claims priority to and the benefit of U.S. Provisional Application No. 62/448,288, filed Jan. 19, 2017, the entire contents of both of which are incorporated herein by reference.

FIELD

One or more aspects of embodiments according to the present invention relate to wireless communication systems, and more particularly to a method and apparatus for interference demodulation reference signal detection with serving signal cancellation.

BACKGROUND

In Long-Term Evolution (LTE) systems, the user equipment (UE) receiving a desired signal (or "served signal") may also receive an interfering signal, which may degrade the user equipment's ability to receive the served signal. If the user equipment is in possession of a model of the interfering signal, it may be able to cancel the interfering signal, improving reception of the served signal, in an approach referred to as interference aware detection (IAD).

Thus, there is a need for a method and apparatus for forming a model of an interfering signal.

SUMMARY

Aspects of embodiments of the present disclosure are directed toward a system and method for characterizing an interference demodulation reference signal (DMRS) in a piece of user equipment (UE), e.g., a mobile device. The UE determines whether the serving signal is transmitted in a DMRS-based transmission mode; if it is, the UE cancels the serving DMRS from the received signal; otherwise the UE cancels the serving data signal from the received signal. The remaining signal is then analyzed for the amount of power it has in each of four interference DMRS candidates, and hypothesis testing is performed to determine whether interference DMRS is present in the signal, and, if so, to determine the rank of the interference DMRS, and the port and scrambling identity of each of the interference DMRS layers.

According to an embodiment of the present invention there is provided a method for characterizing a hypothesized interference demodulation reference signal (DMRS) component of a received signal in a piece of In Long-Term Evolution (LTE) user equipment, the method including: removing, from the received signal, one of: a serving data signal and a serving DMRS, to form a diminished signal; and determining, from the diminished signal, whether the hypothesized interference DMRS component is present in the received signal.

In one embodiment, the removing of the one of a serving data signal and a serving DMRS from the received signal includes: determining whether a serving signal component of the received signal includes the serving DMRS; removing the serving DMRS from the received signal when it is determined that the serving signal component of the received signal includes the serving DMRS; and removing the serving data signal from the received signal otherwise.

In one embodiment, the removing of the serving data signal from the received signal includes utilizing hard output from a detector/decoder to represent the serving data signal.

In one embodiment, the removing of the serving data signal from the received signal includes utilizing soft output from a detector/decoder to represent the serving data signal.

In one embodiment, the method includes determining a rank of the hypothesized interference DMRS component, wherein the determining of the rank of the hypothesized interference DMRS component includes calculating four power levels within a resource block of the diminished signal, each of the four power levels being a power level for a respective one of four interference DMRS candidates, each of the four interference DMRS candidates having a different combination of port number and scrambling identity, each of the port numbers being 7 or 8, and each of the scrambling identities being 0 or 1.

In one embodiment, the determining of the rank of the hypothesized interference DMRS component further includes: calculating a first testing ratio as the ratio of: the power level of the other DMRS candidate, of the four interference DMRS candidates, having the same scrambling identity as the DMRS candidate, of the four interference DMRS candidates, having the greatest one of the four power levels; to the greatest one of the four power levels; determining that the rank of the hypothesized interference DMRS component is 2 when the first testing ratio exceeds a first threshold; and determining that the rank of the hypothesized interference DMRS component is 1 otherwise.

In one embodiment, the determining of whether the hypothesized interference DMRS component is present in the received signal includes, when the determined rank is 1: calculating a second testing ratio as the ratio of: the greatest one of the four power levels; to the difference between: the total of the four power levels; and the greatest one of the four power levels; and determining that the hypothesized interference DMRS component is present when the second testing ratio exceeds a second threshold.

In one embodiment, the method includes determining a port number and a scrambling identity of each layer of the hypothesized interference DMRS component, wherein the determining of the port number and the scrambling identity of each layer of the hypothesized interference DMRS component includes determining the port number and the scrambling identity to be those of the DMRS candidate having the greatest power.

In one embodiment, the determining of whether the hypothesized interference DMRS component is present in the received signal includes, when the determined rank is 2: calculating a third testing ratio as the ratio of: the sum of: the greatest one of the four power levels; and the power level of the other DMRS candidate having the same scrambling identity as the DMRS candidate having the greatest one of the four power levels; and the difference between: the total of the four power levels; and the sum of: the greatest one of the four power levels; and the power level of the other DMRS candidate having the same scrambling identity as the DMRS candidate having the greatest one of the four power levels; and determining that the hypothesized interference DMRS component is present when the third testing ratio exceeds a third threshold.

In one embodiment, the determining of the port number and the scrambling identity of each layer of the hypothesized interference DMRS component includes: determining the port number and the scrambling identity of a first layer of the hypothesized interference DMRS component to be those of the DMRS candidate having the greatest power; and determining the port number and the scrambling identity of a second layer of the hypothesized interference DMRS component to be those of the other DMRS candidate having the same scrambling identity as the DMRS candidate having the greatest power.

According to an embodiment of the present invention there is provided a system for characterizing a hypothesized interference demodulation reference signal (DMRS) component of a received signal in a piece of In Long-Term Evolution (LTE) user equipment, the system including a processing circuit configured to: remove one of: a serving data signal, and a serving DMRS from the received signal, to form a diminished signal; and determine whether the hypothesized interference DMRS component is present in the received signal.

In one embodiment, the removing of the one of a serving data signal and a serving DMRS from the received signal includes: determining whether a serving signal component of the received signal includes the serving DMRS; removing the serving DMRS from the received signal when it is determined that the serving signal component of the received signal includes the serving DMRS; and removing the serving data signal from the received signal otherwise.

In one embodiment, the removing of the serving data signal from the received signal includes utilizing hard output from a detector/decoder to represent the serving data signal.

In one embodiment, the removing of the serving data signal from the received signal includes utilizing soft output from a detector/decoder to represent the serving data signal.

In one embodiment, the processing circuit is further configured to determine a rank of the hypothesized interference DMRS component, and wherein the determining of the rank of the hypothesized interference DMRS component includes calculating four power levels within a resource block of the diminished signal, each of the four power levels being a power level for a respective one of four interference DMRS candidates, each of the four interference DMRS candidates having a different combination of port number and scrambling identity, each of the port numbers being 7 or 8, and each of the scrambling identities being 0 or 1.

In one embodiment, the determining of the rank of the hypothesized interference DMRS component further includes: calculating a first testing ratio as the ratio of: the power level of the other DMRS candidate, of the four interference DMRS candidates, having the same scrambling identity as the DMRS candidate, of the four interference DMRS candidates, having the greatest one of the four power levels; to the greatest one of the four power levels; determining that the rank of the hypothesized interference DMRS component is 2 when the first testing ratio exceeds a first threshold; and determining that the rank of the hypothesized interference DMRS component is 1 otherwise.

In one embodiment, the determining of whether the hypothesized interference DMRS component is present in the received signal includes, when the determined rank is 1: calculating a second testing ratio as the ratio of: the greatest one of the four power levels; to the difference between: the total of the four power levels; and the greatest one of the four power levels; and determining that the hypothesized interference DMRS component is present when the second testing ratio exceeds a second threshold.

In one embodiment, the processing circuit is further configured to determine a port number and a scrambling identity of each layer of the hypothesized interference DMRS component, and wherein the determining of the port number and the scrambling identity of each layer of the hypothesized interference DMRS component includes determining the port number and the scrambling identity to be those of the DMRS candidate having the greatest power.

In one embodiment, the determining of whether the hypothesized interference DMRS component is present in the received signal includes, when the determined rank is 2: calculating a third testing ratio as the ratio of: the sum of: the greatest one of the four power levels; and the power level of the other DMRS candidate having the same scrambling identity as the DMRS candidate having the greatest one of the four power levels; and the difference between: the total of the four power levels; and the sum of: the greatest one of the four power levels; and the power level of the other DMRS candidate having the same scrambling identity as the DMRS candidate having the greatest one of the four power levels; and determining that the hypothesized interference DMRS component is present when the third testing ratio exceeds a third threshold.

In one embodiment, the processing circuit is further configured to determine a port number and a scrambling identity of each layer of the hypothesized interference DMRS component, and wherein the determining of the port number and the scrambling identity of each layer of the hypothesized interference DMRS component includes: determining the port number and the scrambling identity of a first layer of the hypothesized interference DMRS component to be those of the DMRS candidate having the greatest power; and determining the port number and the scrambling identity of a second layer of the hypothesized interference DMRS component to be those of the other DMRS candidate having the same scrambling identity as the DMRS candidate having the greatest power.

BRIEF DESCRIPTION OF THE DRAWINGS

These and other features and advantages of the present invention will be appreciated and understood with reference to the specification, claims, and appended drawings wherein:

DETAILED DESCRIPTION

Figure 1:
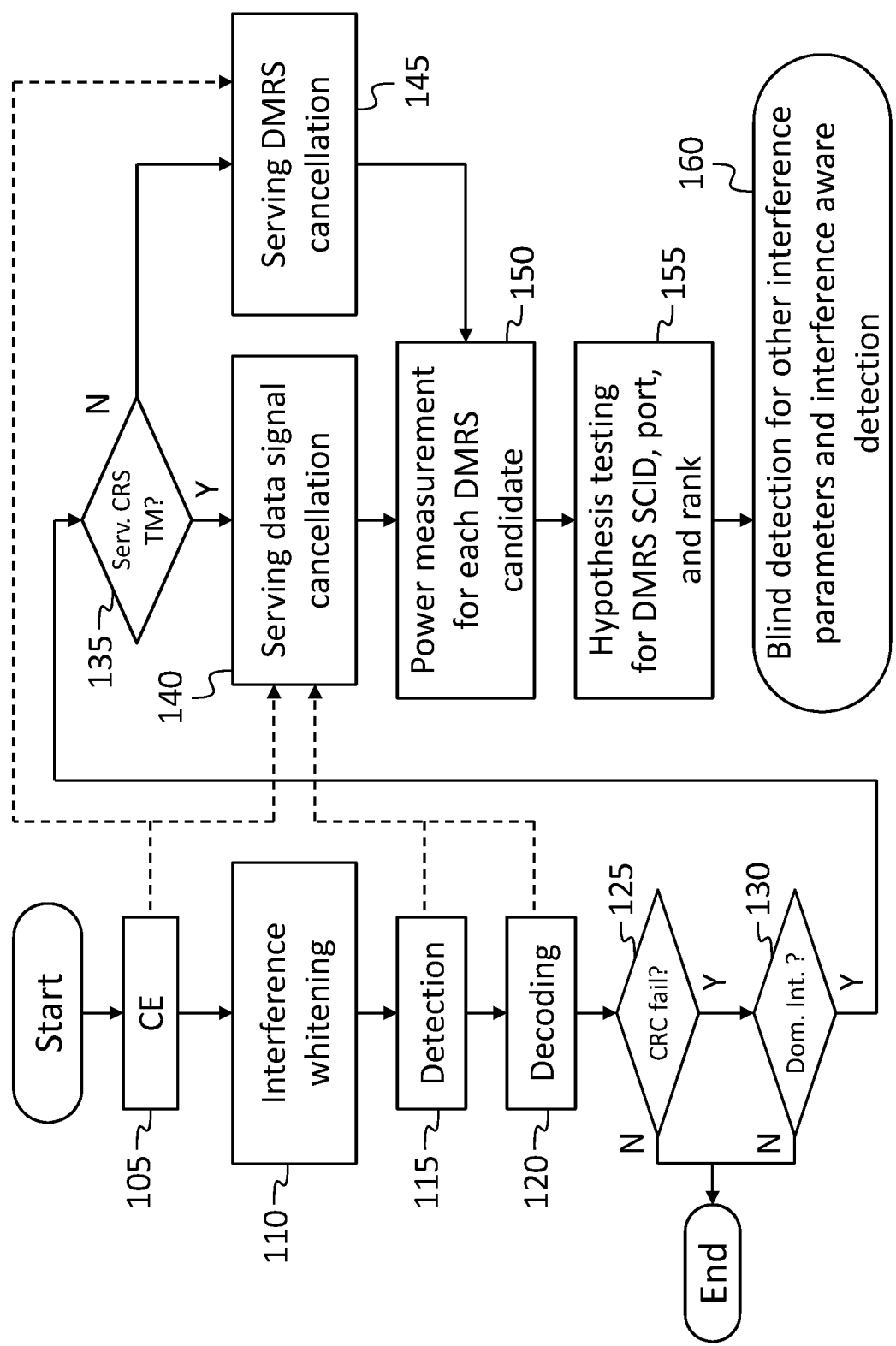
FIG. 1 is a flow chart showing a method for characterizing interference DMRS, according to an embodiment of the present invention.

The detailed description set forth below in connection with the appended drawings is intended as a description of exemplary embodiments of a method and apparatus for interference demodulation reference signal detection with serving signal cancellation provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Network assisted interference cancellation and suppression (NAICS) has been adopted in the 3rd Generation Partnership Project (3GPP) as an optional feature of Long Term Evolution (LTE)-Advanced Release-12 (Rel-12). The use of network assisted interference cancellation and suppression may increase the data rate in a downlink (or "forward link") to a piece of user equipment (UE) (i.e., in the link from a cellular base station the piece of user equipment). As used herein, the term "UE" may refer either to "user equipment" in general, or "UE" may be used in a countable sense to refer to a piece of user equipment.

The downlink signal to a UE (i.e., the signal transmitted by a cellular base station and intended for the UE, referred to herein as the "serving signal") may be transmitted in any of various transmission modes (TMs), some of which (e.g., TM2, TM3, TM4, and TM6) are cell-specific reference signal (CRS) based transmission modes, and some of which (e.g., TM8, TM9, and TM10) include a demodulation reference signal (DMRS).

Other downlink signals, transmitted by other cellular base stations, may transmit a DMRS (referred to herein as "interference DMRS") that may interfere with the serving signal, and, in particular, with the DMRS component of the serving signal if the transmission mode is one that uses DMRS, or with a component of the serving signal referred to as the "serving data signal" otherwise. Such interference may occur because the interference DMRS may be transmitted in the same resource elements as the serving DMRS or the serving data signal (each resource element (RE) being a location occupied by one symbol in one of a plurality of subcarriers that form the transmitted (serving or interference) signal).

To characterize the interference DMRS (for the purpose of performing interference aware detection) it may be advantageous to first cancel the component of the serving signal with which the interference DMRS interferes (or "collides"), i.e., to remove this component from the received signal, to form a signal referred to herein as the "diminished" signal. The interference DMRS may then be more accurately and reliably characterized, by analyzing the diminished signal. These processes are described in further detail below.

FIG. 1 illustrates a method for characterizing interference DMRS, according to one embodiment. In this embodiment, channel estimation (CE) is performed in an act 105, interference whitening is performed in an act 110, detection is performed in an act 115, and decoding is performed in an act 120. Then, in an act 125 it is determined whether a cyclic redundancy check (CRC) failed, and, in an act 130 it is determined whether a dominant interfering signal is present (e.g., using a CRS RSRP measurement). If either the cyclic redundancy check (CRC) did not fail or if no dominant interfering signal is present, the method ends; otherwise, the method proceeds to act 135, in which the UE determines whether the serving signal is being transmitted in a CRS based transmission mode.

If the serving signal is being transmitted in a CRS based transmission mode, the serving data signal (obtained during detection (act 115), and decoding (act 120)) is removed (or "canceled") from the received signal, in an act 140; otherwise, the serving DMRS is removed (or "canceled") from the received signal, in an act 145. The serving data signal may be canceled from the received signal, in the act 140, using either hard or soft output from the detector/decoder.

After the cancellation from the serving signal of the portion of the serving signal that collides with the interference DMRS (i.e., the cancellation of either the serving data signal or the serving DMRS), only the interference DMRS remains in the resource elements affected by the interference DMRS. The cancellation performed in the acts 140, 145 may be imperfect, e.g., because the decoded data signal may contain errors (e.g., the errors that resulted in the CRC failure); the characterization of the interference DMRS may nonetheless be sufficiently good to enable effective interference aware detection.

The power in (or "power level" of) each of a plurality of interference DMRS candidates may then be measured, in an act 150. Each of these interference DMRS candidates may correspond to a different combination of port (i.e., antenna port) and scrambling identity (SCID). The four candidates may be numbered 1-4 as follows:

(1) Interference DMRS candidate 1: DMRS with port7 and SCID0
(2) Interference DMRS candidate 2: DMRS with port7 and SCID1
(3) Interference DMRS candidate 3: DMRS with port8 and SCID0
(4) Interference DMRS candidate 4: DMRS with port8 and SCID1

In some embodiments, for each interference DMRS candidate, the received signal at DMRS RE locations is descrambled with the corresponding DMRS scrambling sequence. The descrambled DMRS samples are then averaged over all DMRS RE locations in one resource block (RB) under the approximation that the channel does not change much within one resource block. The power estimate $P_i$ of each DMRS candidate is obtained by taking the magnitude square of the averaged DMRS for each DMRS candidate.

The per-RB received signal power at DMRS REs for port 7 and 8 may be calculated using the following equation:

$$P_0 = \sum_{j=0}^{N_r-1} \left( \frac{1}{12} \sum_{(k,l) \in DMRS \ REs \ for \ port \ 7/8} \|r_j(k,l)\|^2 \right),$$

where $r_j(k, l)$ is the received signal after serving signal cancellation at a DMRS RE for port 7 and 8, where j, k, and l denote receive antenna index, subcarrier index, and orthogonal frequency division multiplexing (OFDM) symbol index, respectively, and where $N_r$ is the number of receive antennas. The calculation may be performed over 12 DMRS resource elements in the resource block. The inner sum in the equation above is divided by 12 for convenience, so that the power calculated is power per resource element.

Assuming that the channel does not change much within one resource block (RB), the per-RB DMRS power for interference DMRS candidate i may be calculated using the following equation:

$$P_i = \sum_{j=0}^{N_r-1} \left\| \frac{1}{12} \sum_{(k,l) \in DMRS \ REs \ for \ port \ 7/8} r_j(k,l)(x^i(k,l)w^i(k,l))^* \right\|^2,$$

where $x^i(k, l)$ and $w^i(k, l)$ are the scrambling sequence and orthogonal cover code (OCC) of DMRS layer i at the resource element with index (k, l). The inner sum in the equation above is divided by 12 for convenience, so that the power calculated is power per resource element. Because the four candidates are orthogonal and span the space of possible DMRS signals, the power $P_0$, i.e., the per-RB received signal power at DMRS REs for port 7 and 8 is equal to the sum of the respective power of each of the four DMRS candidates:

$$P_0 \approx \sum_{i=1}^{4} P_i,$$

Hypothesis testing may then be performed, in an act 155, to determine whether a hypothesized interference DMRS component is present in the signal, and, if so, what its rank, port number, and scrambling identity are. This may be done by considering the following seven hypotheses:
Hypothesis 0: No interference DMRS
Hypothesis 1: Interference DMRS candidate 1 (rank1)
Hypothesis 2: Interference DMRS candidate 2 (rank1)
Hypothesis 3: Interference DMRS candidate 3 (rank1)
Hypothesis 4: Interference DMRS candidate 4 (rank1)
Hypothesis 5: Interference DMRS candidate 1 and candidate 3 (rank2)
Hypothesis 6: Interference DMRS candidate 2 and candidate 4 (rank2)

When the rank of the interference DMRS is 2, the interference DMRS may be said to consist of two layers, each having a respective port number and scrambling identity (when the rank is 1, the interference DMRS may be said to consist of a single layer). A test may be done to determine whether one of the two rank 2 hypotheses (Hypothesis 5 or Hypothesis 6) fits the observations. To perform this test, the DMRS candidates are paired (as in Hypothesis 5 and Hypothesis 6), each DMRS candidate being paired with the other candidate having the same SCID, i.e., DMRS candidate 1 being paired with DMRS candidate 3, and DMRS candidate 2 being paired with DMRS candidate 4. The index of the DMRS candidate with the greatest power is denoted $i_{max}$, and the index of the DMRS candidate paired with it is denoted $\bar{i}_{max}$ i.e., $$i_{max} = \underset{i}{\mathrm{argmax}}\ P_i, \bar{i}_{max} = \begin{cases} 3, & i_{max} = 1, \\ 4, & i_{max} = 2, \\ 1, & i_{max} = 3, \\ 2, & i_{max} = 4. \end{cases}$$

The system may then declare that the interference DMRS is rank 2 if $$\frac{P_{\bar{i}_{max}}}{P_{i_{max}}} > \gamma_0,$$

i.e., if a first testing ratio, equal to the ratio of (i) the power $P_{\bar{i}_{max}}$ calculated for the DMRS candidate that is paired with (i.e., has the same SCID as) the DMRS candidate for which the calculated power is greatest to (ii) the greatest calculated power $P_{i_{max}}$ exceeds a first threshold $\gamma_0$. The value of the first threshold may be selected to be less than 1.0 and sufficiently great that the likelihood of rank 2 being declared, when the interference DMRS is in fact rank 1, is acceptably small. In some embodiments the first threshold is greater than or equal to 0.1 and less than 1.0, e.g., in the range 0.5-0.9.

Once the rank has been declared, further hypothesis testing is performed to determine whether or not interference DMRS is present. If rank 1 has been declared, this test may declare that interference DMRS is present if $$\frac{P_{i_{max}}}{P_0 - P_{i_{max}}} > \gamma_1,$$

i.e., if a second testing ratio, equal to the ratio of (i) the greatest calculated power $P_{i_{max}}$ to (ii) the difference between (a) the total power $P_0$ and (b) the greatest calculated power $P_{i_{max}}$ is greater than a second threshold $\gamma_1$. The second threshold may be selected in accordance to the interference signal to noise ratio, a larger value of the second threshold being appropriate for a higher interference signal to noise ratio. In some embodiments, for an interference signal to noise ratio of 3 dB, for example, the second threshold may be set to a value in the range 0.2-0.5.

If rank 1 is declared and it is determined that interference DMRS is present, then the port number and SCID of the candidate with the greatest power are declared to be the port number and SCID of the single layer of the interference DMRS.

If rank 2 has been declared, the hypothesis test may declare that interference DMRS is present if $$\frac{P_{i_{max}} + P_{\bar{i}_{max}}}{P_0 - P_{i_{max}} - P_{\bar{i}_{max}}} > \gamma_2,$$

i.e., if a third testing ratio, equal to the ratio of (i) the sum of (a) the greatest calculated power $P_{i_{max}}$ and (b) the power $P_{\bar{i}_{max}}$ of the other DMRS candidate having the same SCID as the DMRS candidate with the greatest power to (ii) the difference between (a) the total power $P_0$ and (b) the sum of (1) the greatest calculated power $P_{i_{max}}$ and (2) the power $P_{\bar{i}_{max}}$ of the other DMRS candidate having the same SCID as the DMRS candidate having the greatest power is greater than a third threshold $\gamma_2$. If rank 2 is declared and it is determined that interference DMRS is present, then the port number and SCID of the candidate with the greatest power are declared to be the port number and SCID of one of the two layers of the interference DMRS, and the port number and SCID of the candidate with which this candidate is paired are declared to be the port number and SCID of the other one of the two layers of the interference DMRS.

In some embodiments, $\gamma_0$, $\gamma_1$, and $\gamma_2$ are selected according to the following equations:

$$\gamma_0 = 10^{\frac{-(INRdB+16)}{2.4}}$$

$$\gamma_1 = 10^{\frac{INRdB-12.4}{2.9}}$$

$$\gamma_2 = 10^{\frac{INRdB-6}{2.5}}$$

where INRdB is the interference signal to noise ratio, in decibels (dB).

Once it is determined whether interference DMRS is present, and, if so, what its rank is, and what the port number and scrambling identity of each of its layers are, then in an act 160, other interference parameters may be detected using blind detection, or obtained from the network (as part of network assisted interference cancellation and suppression (NAICS), and interference aware detection may be performed using these interference parameters. It will be understood that the hypothesis testing has many variants, each of which is within the scope of the invention, although only one is discussed in detail here.

Figure 2A:
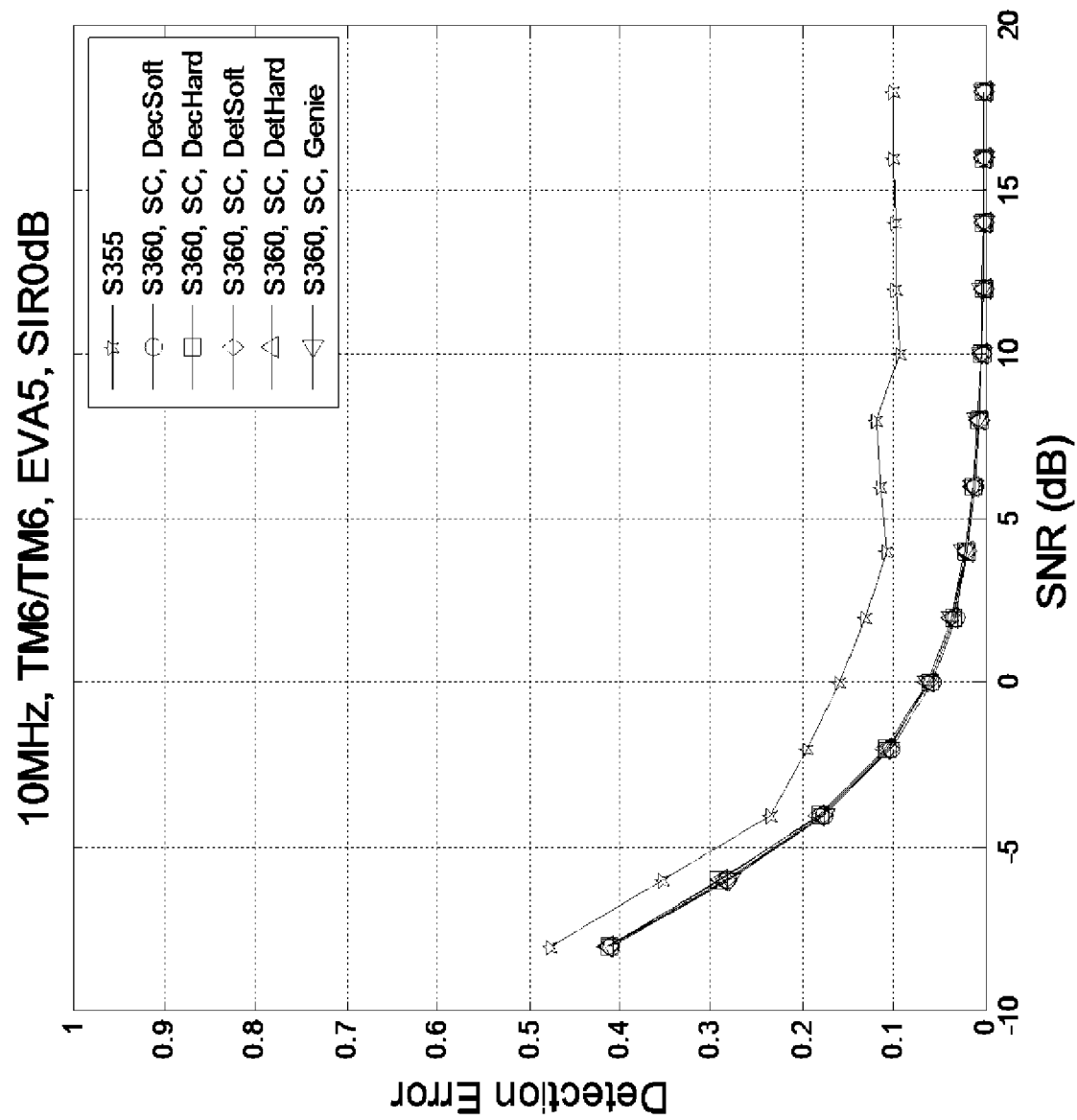
FIG. 2A is a graph of detection error as a function of signal to noise ratio, according to an embodiment of the present invention.
Figure 2B:
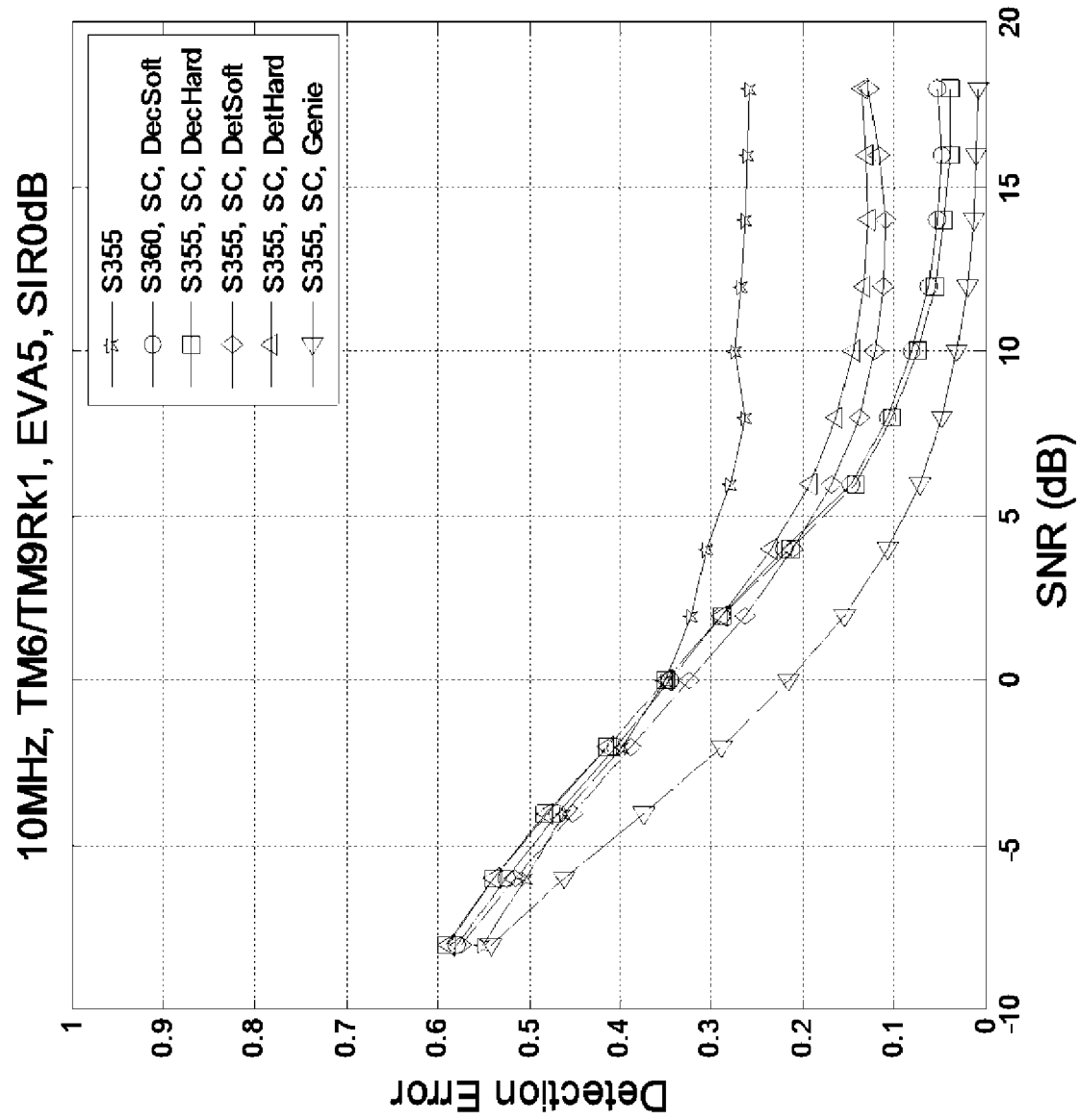
FIG. 2B is a graph of detection error as a function of signal to noise ratio, according to an embodiment of the present invention.
Figure 2C:
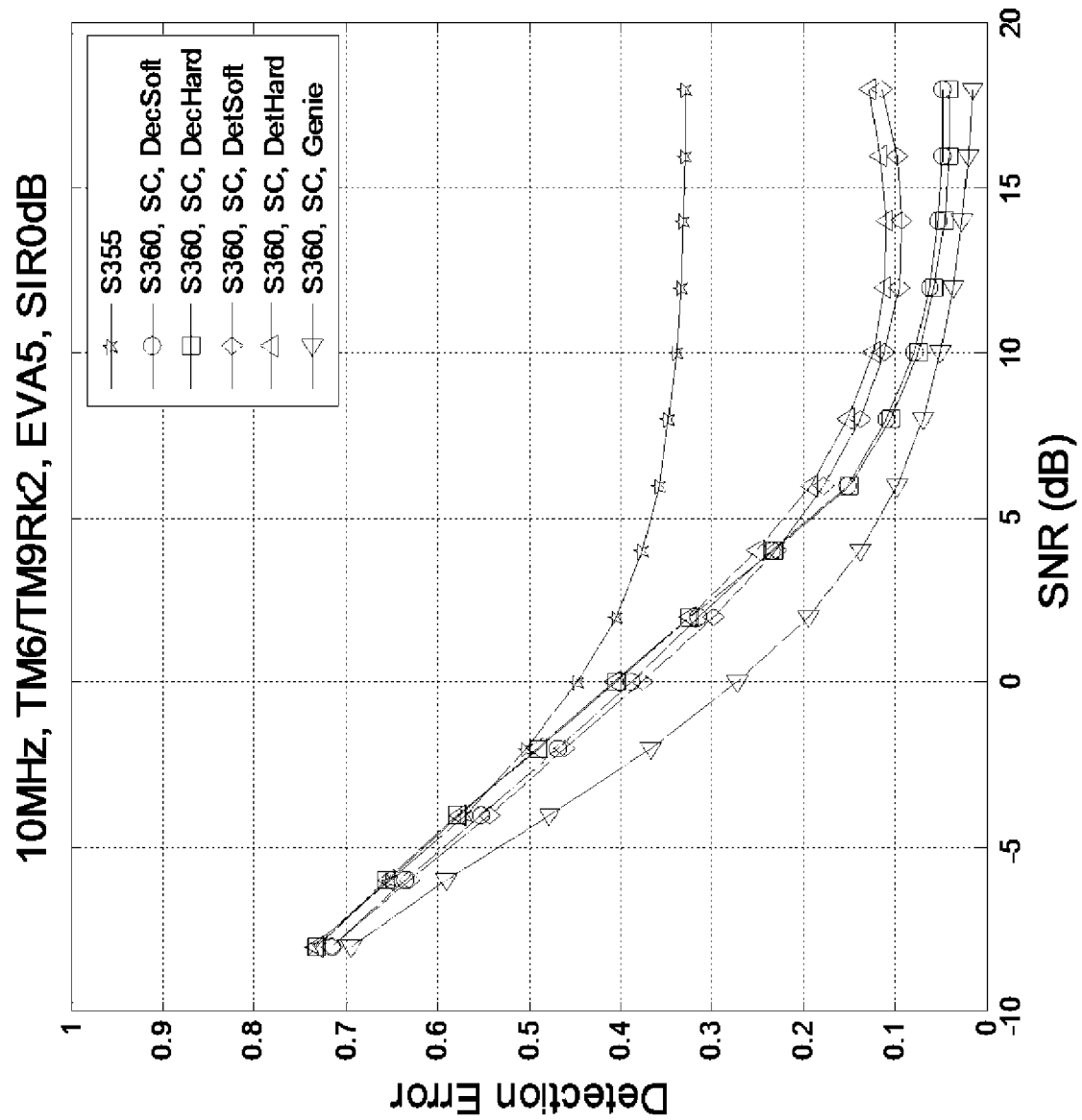
FIG. 2C is a graph of detection error as a function of signal to noise ratio, according to an embodiment of the present invention.

FIGS. 2A-2C are graphs of detection error as a function of signal to noise ratio. The two transmission modes (TMs) identified in the title of each graph are the serving and interference TMs, respectively. The horizontal axis, labeled "SNR" is the serving signal to noise ratio, which, in the simulations used to generate these graphs, is equal to the interference signal to noise ratio (which may also be referred to as the "INR"). The detection error is the hypothesis testing error, i.e., the fraction of the time, in simulation, that the error of not declaring the correct hypothesis among the 7 hypotheses is made.

Figure 3:
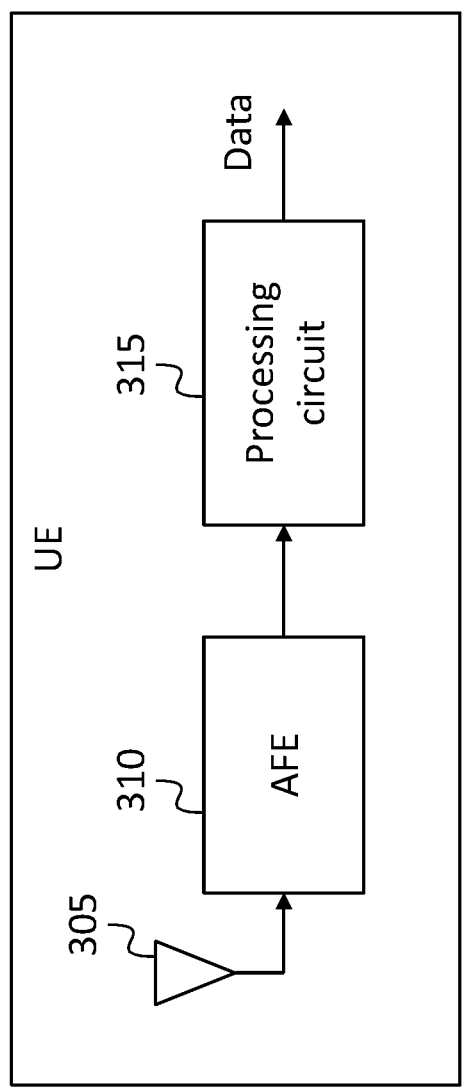
FIG. 3 is a block diagram of a system for receiving data, according to an embodiment of the present invention.

FIG. 3 shows a system for characterizing interference DMRS and performing interference aware detection. An antenna 305 receives a signal, which is amplified and otherwise processed (e.g., processed by a frequency conversion block, one or more filters, and an analog to digital converter) in an analog front end 310 to generate a digital data stream, which is fed into a processing circuit 315 (described in further detail below). The processing circuit 315 is configured (e.g., programmed) to execute methods according to embodiments discussed herein, to characterize interference DMRS, and perform interference aware detection, and to generate a stream of received data.

In light of the foregoing, some embodiments provide a system and method for characterizing an interference demodulation reference signal (DMRS) in a piece of user equipment (UE), e.g., a mobile device. The UE determines whether the serving signal is transmitted in a DMRS-based transmission mode; if it is, the UE cancels the serving DMRS from the received signal; otherwise the UE cancels the serving data signal from the received signal. The remaining signal is then analyzed for the amount of power it has in each of four interference DMRS candidates, and hypothesis testing is performed to determine whether interference DMRS is present in the signal, and, if so, to determine the rank of the interference DMRS, and the port and scrambling identity of each of the interference DMRS layers.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a method and apparatus for interference demodulation reference signal detection with serving signal cancellation have been specifically described and illustrated herein, many modifications and variations will be apparent to those skilled in the art. Accordingly, it is to be understood that a method and apparatus for interference demodulation reference signal detection with serving signal cancellation constructed according to principles of this invention may be embodied other than as specifically described herein. The invention is also defined in the following claims, and equivalents thereof.

What is claimed is:

1. A method for characterizing a hypothesized interference demodulation reference signal (DMRS) component of a received signal, the method comprising:
   canceling, from the received signal, a serving data signal, to form a diminished signal; and
   determining, from the diminished signal, whether the hypothesized interference DMRS component is present in the received signal.

2. The method of claim 1, wherein the canceling of the serving data signal from the received signal comprises utilizing hard output from a detector/decoder to represent the serving data signal.

3. The method of claim 1, wherein the canceling of the serving data signal from the received signal comprises utilizing soft output from a detector/decoder to represent the serving data signal.

4. The method of claim 1, further comprising determining a rank of the hypothesized interference DMRS component,
   wherein the determining of the rank of the hypothesized interference DMRS component comprises calculating four power levels within a resource block of the diminished signal, each of the four power levels being a power level for a respective one of four interference DMRS candidates,
   each of the four interference DMRS candidates having a different combination of port number and scrambling identity, each of the port numbers being 7 or 8, and each of the scrambling identities being 0 or 1.

5. The method of claim 4, wherein the determining of the rank of the hypothesized interference DMRS component further comprises:
   calculating a first testing ratio as the ratio of:
      the power level of the other DMRS candidate, of the four interference DMRS candidates, having the same scrambling identity as the DMRS candidate, of the four interference DMRS candidates, having the greatest one of the four power levels; to
      the greatest one of the four power levels;
   determining that the rank of the hypothesized interference DMRS component is 2 when the first testing ratio exceeds a first threshold; and
   determining that the rank of the hypothesized interference DMRS component is 1 otherwise.

6. The method of claim 5, wherein the determining of whether the hypothesized interference DMRS component is present in the received signal comprises, when the determined rank is 1:
   calculating a second testing ratio as the ratio of:
      the greatest one of the four power levels; to
      the difference between:
         the total of the four power levels; and
         the greatest one of the four power levels; and
   determining that the hypothesized interference DMRS component is present when the second testing ratio exceeds a second threshold.

7. The method of claim 6, further comprising determining a port number and a scrambling identity of each layer of the hypothesized interference DMRS component,
   wherein the determining of the port number and the scrambling identity of each layer of the hypothesized interference DMRS component comprises determining the port number and the scrambling identity to be those of the DMRS candidate having the greatest power.

8. The method of claim 5, wherein the determining of whether the hypothesized interference DMRS component is present in the received signal comprises, when the determined rank is 2:
   calculating a third testing ratio as the ratio of:
      the sum of:
         the greatest one of the four power levels; and
         the power level of the other DMRS candidate having the same scrambling identity as the DMRS candidate having the greatest one of the four power levels; and
      the difference between:
         the total of the four power levels; and
         the sum of:
            the greatest one of the four power levels; and
            the power level of the other DMRS candidate having the same scrambling identity as the DMRS candidate having the greatest one of the four power levels; and
   determining that the hypothesized interference DMRS component is present when the third testing ratio exceeds a third threshold.

9. The method of claim 8, wherein the determining of the port number and the scrambling identity of each layer of the hypothesized interference DMRS component comprises:
   determining the port number and the scrambling identity of a first layer of the hypothesized interference DMRS component to be those of the DMRS candidate having the greatest power; and
   determining the port number and the scrambling identity of a second layer of the hypothesized interference DMRS component to be those of the other DMRS candidate having the same scrambling identity as the DMRS candidate having the greatest power.

10. A method for characterizing a hypothesized interference demodulation reference signal (DMRS) component of a received signal, the method comprising:
    canceling, from the received signal, one of:
       a serving data signal and
       a serving DMRS,
       to form a diminished signal;
    determining, from the diminished signal, whether the hypothesized interference DMRS component is present in the received signal; and
    determining a rank of the hypothesized interference DMRS component.

11. The method of claim 10, wherein the canceling of the one of a serving data signal and a serving DMRS from the received signal comprises:
    determining whether a serving signal component of the received signal includes the serving DMRS;
    removing the serving DMRS from the received signal when it is determined that the serving signal component of the received signal includes the serving DMRS; and
    removing the serving data signal from the received signal otherwise.

12. The method of claim 11, wherein the canceling of the serving data signal from the received signal comprises utilizing hard output from a detector/decoder to represent the serving data signal.

13. The method of claim 11, wherein the canceling of the serving data signal from the received signal comprises utilizing soft output from a detector/decoder to represent the serving data signal.

14. The method of claim 10,
    wherein the determining of the rank of the hypothesized interference DMRS component comprises calculating four power levels within a resource block of the diminished signal, each of the four power levels being a power level for a respective one of four interference DMRS candidates,
each of the four interference DMRS candidates having a different combination of port number and scrambling identity, each of the port numbers being 7 or 8, and each of the scrambling identities being 0 or 1.

15. The method of claim 14, wherein the determining of the rank of the hypothesized interference DMRS component further comprises:
calculating a first testing ratio as the ratio of:
the power level of the other DMRS candidate, of the four interference DMRS candidates, having the same scrambling identity as the DMRS candidate, of the four interference DMRS candidates, having the greatest one of the four power levels; to
the greatest one of the four power levels;
determining that the rank of the hypothesized interference DMRS component is 2 when the first testing ratio exceeds a first threshold; and
determining that the rank of the hypothesized interference DMRS component is 1 otherwise.

16. The method of claim 15, wherein the determining of whether the hypothesized interference DMRS component is present in the received signal comprises, when the determined rank is 1:
calculating a second testing ratio as the ratio of:
the greatest one of the four power levels; to
the difference between:
the total of the four power levels; and
the greatest one of the four power levels; and
determining that the hypothesized interference DMRS component is present when the second testing ratio exceeds a second threshold.

17. The method of claim 16, further comprising determining a port number and a scrambling identity of each layer of the hypothesized interference DMRS component,
wherein the determining of the port number and the scrambling identity of each layer of the hypothesized interference DMRS component comprises determining the port number and the scrambling identity to be those of the DMRS candidate having the greatest power.

18. The method of claim 15, wherein the determining of whether the hypothesized interference DMRS component is present in the received signal comprises, when the determined rank is 2:
calculating a third testing ratio as the ratio of:
the sum of:
the greatest one of the four power levels; and
the power level of the other DMRS candidate having the same scrambling identity as the DMRS candidate having the greatest one of the four power levels; and
the difference between:
the total of the four power levels; and
the sum of:
the greatest one of the four power levels; and
the power level of the other DMRS candidate having the same scrambling identity as the DMRS candidate having the greatest one of the four power levels; and
determining that the hypothesized interference DMRS component is present when the third testing ratio exceeds a third threshold.

19. The method of claim 18, wherein the determining of the port number and the scrambling identity of each layer of the hypothesized interference DMRS component comprises:
determining the port number and the scrambling identity of a first layer of the hypothesized interference DMRS component to be those of the DMRS candidate having the greatest power; and
determining the port number and the scrambling identity of a second layer of the hypothesized interference DMRS component to be those of the other DMRS candidate having the same scrambling identity as the DMRS candidate having the greatest power.

20. A system for characterizing a hypothesized interference demodulation reference signal (DMRS) component of a received signal, the system comprising a processing circuit configured to:
cancel a serving data signal from the received signal, to form a diminished signal; and
determine whether the hypothesized interference DMRS component is present in the received signal.

* * * * *